United States Patent [19]
Brown et al.

[11] Patent Number: 5,111,563
[45] Date of Patent: May 12, 1992

[54] SELF-LOADING, CONTROLLED DEFLECTION ROLL

[75] Inventors: Dale A. Brown, Milton; Arnold J. Roerig, Beloit, both of Wis.

[73] Assignee: Beloit Corporation, Beloit, Wis.

[21] Appl. No.: 650,348

[22] Filed: Feb. 4, 1991

[51] Int. Cl.⁵ ............................................ B21B 13/02
[52] U.S. Cl. ................... 29/116.2; 29/113.2; 29/116.1
[58] Field of Search ............ 29/113.1, 113.2, 116.1, 29/116.2

[56] References Cited

U.S. PATENT DOCUMENTS

| | | | |
|---|---|---|---|
| 3,389,450 | 6/1968 | Robertson | 29/116.2 |
| 3,885,283 | 5/1975 | Biondetti | 29/116 |
| 4,301,582 | 11/1981 | Riihinen | 29/116 |
| 4,308,651 | 1/1982 | Appenzeller et al. | 29/116 |
| 4,805,279 | 2/1989 | Pav | 29/116.2 |
| 4,821,384 | 4/1989 | Arav | 29/113 |
| 4,852,229 | 8/1989 | Crouse | 29/116 |
| 4,919,761 | 4/1990 | Schiel | 29/116.2 X |

*Primary Examiner*—Timothy V. Eley
*Assistant Examiner*—C. Richard Martin
*Attorney, Agent, or Firm*—Dirk J. Veneman; Raymond W. Campbell; Gerald A. Mathews

[57] ABSTRACT

A self-loading, controlled deflection roll for forming a pressure nip with another roll has at least one support shoe, and preferably two opposed support shoes, mounted in a stationary support shaft for controlling the deflection of the roll shell in the direction of the nip. At either end of the controlled deflection roll, a pair of opposed guide shoes are pivotally disposed on the stationary support shaft to apply pressure against the roll shell to stabilize the position of the roll shell relative to the stationary shaft. At least one guide shoe at either end of the roll is equipped with a compensating piston to permit its face surface to move radially outwardly relative to the guide shoe support on the stationary shaft. Also, at least one of the guide shoes at either end of the roll is pivotally supported on the stationary shaft to allow rotational movement of its guide shoe about an axis in a plane substantially parallel with a nip plane through the nip and the longitudinal axis of the roll. The guide shoes provide equal stabilization forces at substantially right angles to the plane of the nip regardless of the relative translational position of the roll shell disposed about the stationary shaft.

7 Claims, 2 Drawing Sheets

SELF-LOADING, CONTROLLED DEFLECTION ROLL

BACKGROUND OF THE INVENTION

1. Field of the Invention

This invention relates to a controlled deflection roll of the type which is commonly used in the press and calender sections of a papermaking machine. More particularly, this invention relates to a self-loading type of controlled deflection roll wherein the roll shell can translate relative to the longitudinal axis of the roll. Still more particularly, this invention relates to a self-loading, controlled deflection roll wherein the roll shell is stabilized by pivotally mounted, adjustably positionable side guide shoe apparatus.

2. Description of the Prior Art

The art relating to self-loading types of controlled deflection rolls having means for stabilizing the roll shell relative to the stationary center shaft during operation is rapidly evolving. An example of such a stabilized self-loading, controlled deflection roll is the subject of pending U.S. patent application Ser. No. 07/541,678 filed Jun. 21, 1990 and commonly assigned with this invention. The subject matter of the application Ser. No. 07/541,678 is hereby incorporated by reference. In that application, a pair of opposed guide shoes are disposed on either side of the center shaft in a self-loading, controlled deflection roll. They are mounted to slide on substantially parallel surfaces in the direction of the plane of the nip with a mating roll. At least one of the shoes includes a piston within an interface between a piston member and an associated guide shoe for permitting radial movement of the opposed guide shoes relative to the stationary support shaft in a plane substantially perpendicular to the plane of the nip with a mating roll.

The problems associated with stabilizing the roll shell in a self-loading type of controlled deflection roll have not long been recognized because self-loading, controlled deflection rolls operating in the field are relatively new. In one type of self-loading, controlled deflection roll, which is described and illustrated in Biondetti U.S. Pat. No. 3,885,283, a pair of collars, each having a pair of flat, parallel surfaces, are disposed at either end of the roll shell to slide over corresponding surfaces on the stationary roll shaft to allow the roll shell to translate reciprocally in its nip plane while the roll shell is rotatably supported about the outer, cylindrical surfaces, which might include bearings, on each of the collars. Lateral stabilization of the roll shell is a function of the clearance between the collars and parallel surfaces on the shaft. The clearance does not provide support.

In Arav, U.S. Pat. No. 4,821,384, diametrically opposed nip loading shoes are positioned in the stationary shaft of a controlled deflection roll to move the roll shell radially inwardly and outwardly in opposed directions relative to the shaft to load and unload the nip. A pair of laterally disposed guide shoes are positioned at either end of the roll to stabilize the roll shell. However, the opposed guide shoes are of a unitary design which limits the extent of the translational movement of the roll shell relative to the stationary support shaft due to the inability of the guide shoes to extend and contract as the radial distance of the inner periphery of the roll shell changes relative to the support surfaces of the guide shoes on the roll shaft during translational movement of the roll shell. The Arav guide shoes cannot compensate for thermal expansion or for dimensional differences caused by manufacturing tolerances. Also, the gap along the interface between the guide shoes and their support surfaces on the roll shaft can only extend for a limited distance radially before the required hydraulic pressure required to maintain the roll shell in a desired position decreases as a function of the increased gap.

Thus, in prior self-loading types of controlled deflection rolls having means for stabilizing the rotating roll shell, deficiencies or inefficiencies in either their structure or mode of operation limit their effectiveness or competitive advantage. In other words, the roll shell stabilization either limits the extent, or travel, of the self-loading capability of the roll, or the apparatus is structurally complicated and expensive.

SUMMARY OF THE INVENTION

The apparatus of this invention is a simpler, less costly design of guide shoe apparatus for use in a self-loading, controlled deflection roll. This invention also incorporates a unique self-aligning mounting for at least one of the guide shoes on either end of the roll. This self-aligning mounting feature for a guide shoe permits the guide shoe to pivot about an axis perpendicular to the nip plane containing the longitudinal axis of the roll. Such pivotal movement allows the guide shoe to maintain its face in more perfect tracking engagement with the inner surface of the roll shell regardless of relative skewing movement between the roll shell and roll shafts in the direction of the nip plane.

This invention also includes pivot pins by which the guide shoes are pivotally mounted in pivot blocks to permit the guide shoes to pivot along axes which are parallel with the longitudinal axis of the roll. This arrangement eliminates the need to machine accurate, smooth surfaced pads on either end of the roll to slidably support the guide shoes and/or compensating pistons. It also eliminates the need for corresponding hydraulic lines in both the shaft and guide shoes, and pockets in the faces of the guide shoes and/or compensating pistons to provide the cushion of pressurized hydraulic fluid along the interface between any guide surface (which itself is not required) and the faces of the compensating piston shoe or guide shoe.

The invention thus provides pivotal motion about mutually perpendicular axes to enhance tracking engagement of the guide shoes on the roll shell, particularly over a wide range of operating conditions.

Accordingly, it is an object of this invention to provide a simple, reliable guide shoe apparatus for stabilizing the rotating roll shell in a self-loading type of controlled deflection roll.

Another object of this invention is to provide a pivoted guide shoe apparatus for stabilizing the roll shell in a self-loading type of controlled deflection roll.

Another object of this invention is to provide a guide shoe stabilizing apparatus for a self-loading type of controlled deflection roll wherein at least one of the guide shoes is pivotable about both of mutually perpendicular axes.

A feature of this invention is the relatively wide range of translational self-loading movement of the roll shell which can be accommodated by the guide shoe stabilization apparatus.

These, and other objects, features and advantages of the invention will be readily discerned by those skilled in the art upon reading the description of the preferred embodiment in conjunction with the claims, specification and drawings of this application.

DESCRIPTION OF THE PREFERRED EMBODIMENT

Figure 2:
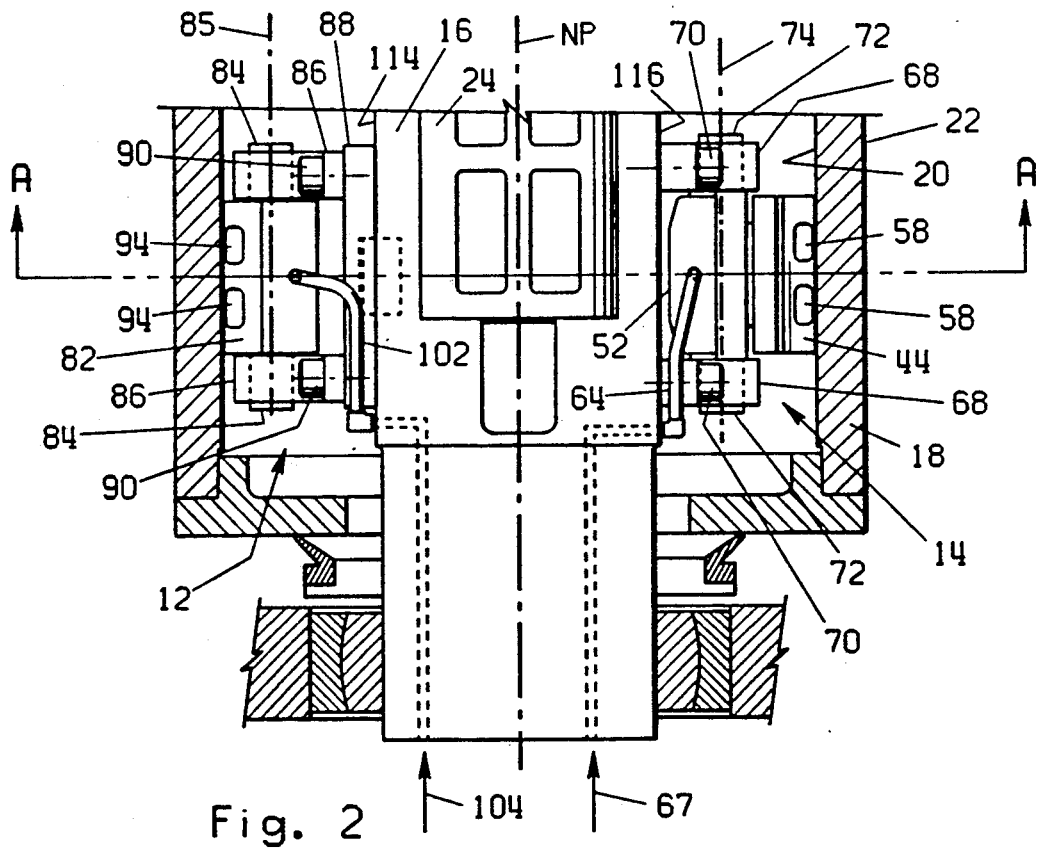
FIG. 2 is a plan view of one end of a self-loading, controlled deflection roll which shows the roll shell in section, and which shows the pivoted connections of the guide shoes to their mountings on the stationary roll shaft.
Figure 1:
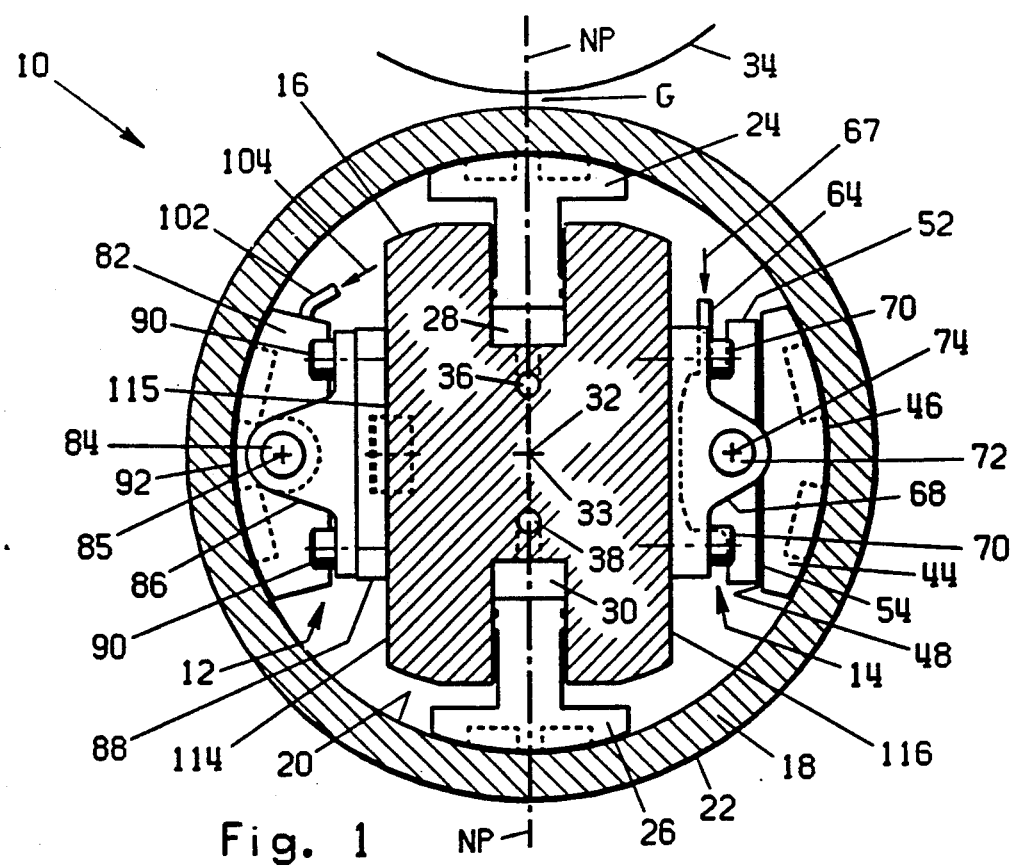
FIG. 1 is an end-elevational view, partially in section, showing the end views of a pair of opposed guide shoe apparatus which are not shown in section.

With reference to FIGS. 1 and 2, a self-loading type of controlled deflection roll, generally designated with numeral 10, is identical at either end insofar as the guide shoe apparatus is concerned, so only one end of the roll is shown and described for brevity and clarity. Accordingly, it will be understood that a second set of opposed guide shoe apparatus, of the type generally designated at 12,14, in FIGS. 1 and 2, are located at the other end of the roll and mounted to the stationary support shaft 16 in the same manner illustrated in FIGS. 1 and 2.

The controlled deflection roll itself, insofar as its standard components are concerned, is well-known to the artisan and, accordingly, will not be described in great detail. Thus, a hollow, cylindrical roll shell 18 having cylindrical inner and outer surfaces 20,22, respectively, is rotatably disposed about the stationary center shaft 16. One, or more, upper and lower support shoes 24,26 are mounted in the shaft and extend longitudinally to support the roll shell on the shaft and is/are operable to reciprocate in chambers 28,30 within the shaft according to whether pressurized hydraulic fluid is admitted or expelled to the pressure chamber(s) 28 beneath the upper support shoe(s) 24 to provide force to lift the roll shell and/or compensate for its deflection in the nip plane NP which is the plane through the nip N (FIG. 4) which also contains the longitudinal axis 33 of roll 10 as well as the longitudinal axis (not shown) of the mating roll 34. The longitudinal axis 33 of the roll 10 is also the longitudinal axis of the roll shell 18.

Figure 3:
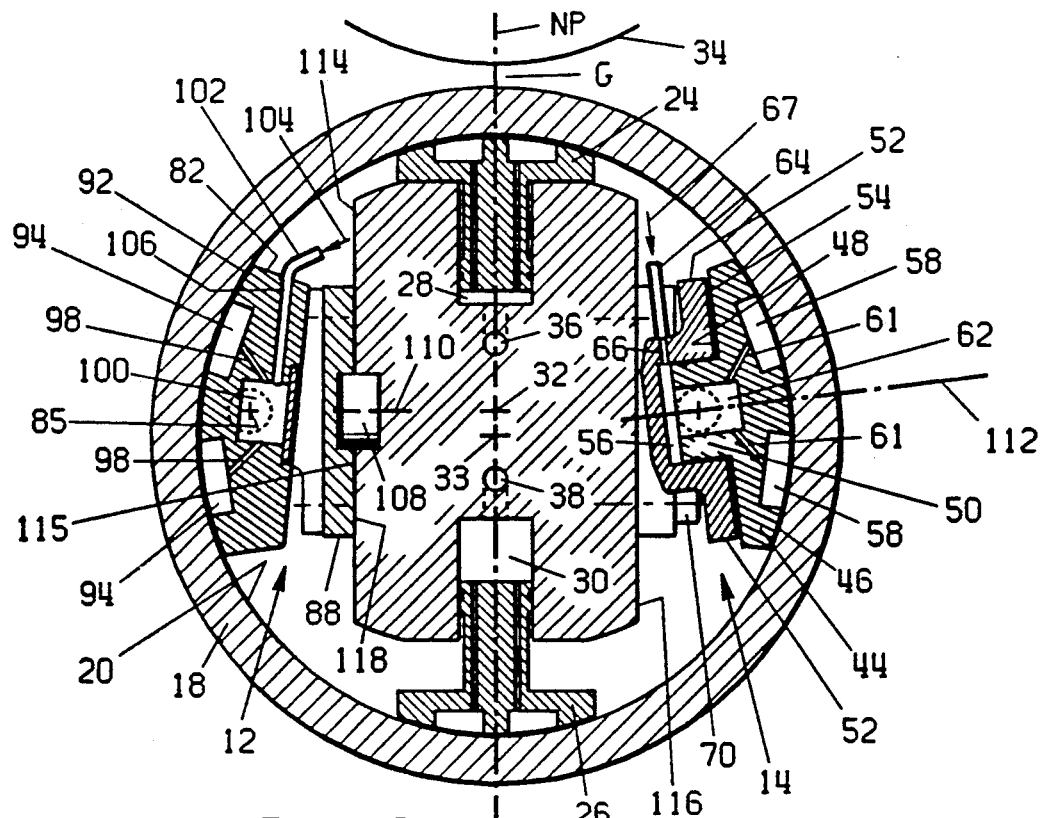
FIG. 3 is an end-elevational view through section A—A of FIG. 2.

Similarly, when the pressure of the hydraulic fluid in upper chamber 28 is relieved, the support shoe 28 can retract into chamber 28 to permit the roll shell to move downwardly, as shown in FIGS. 1 and 3, and open a gap G between the outer surface of the roll shell and the surface of the mating roll.

The lower support shoe, or shoes, 26 is shown in opposed array with the upper support shoe 24. The opposed support shoe 26 operates in conjunction with the upper support shoe 24 to relieve the nip with the mating roll. Thus, when the hydraulic fluid is pressurized in the upper chamber 28 to actuate upper support shoe 24, the hydraulic fluid in chamber 30 of lower support shoe 26 is relieved to permit the lower support shoe 26 to retract into its chamber 30. Similarly, when the hydraulic fluid is pressurized in lower chamber 30 of the lower support shoe to relieve the nip, the hydraulic pressure in the upper chamber 28 of the upper support shoe is relieved to permit it to retract into its chamber 28. The pressurized and relieved hydraulic fluid is conducted in and out of the roll and in and out of the upper and lower chambers 28,30 via conduits 36,38.

The coordinated action of the support shoes 24,26 thus operates to reciprocate the roll shell in the nip plane into and out of nipping engagement with the mating roll. Due to the curvature of the support shoes in the circumferential direction of the roll, some lateral support of the roll shell is also provided. However, the dynamic operating conditions of the roll, which include vibration and the forces associated with the rotating roll shell, both taken in association with the requirements of being able to move the roll shell translationally for a significant distance, such as about 5-10 cm, necessitate lateral guide apparatus which can both support the roll shell laterally and simultaneously accommodating translational movement of the roll shell relative to the roll shaft in the nip plane NP.

In the preferred embodiment, this invention utilizes pivoted, laterally disposed guide shoe apparatus 12,14 on either side of each end of the roll and which are slightly different on each opposed side of the roll.

As shown more clearly in FIGS. 1 and 3, the guide shoe apparatus 14 on the right side of the support center shaft 16 includes a guide shoe 44 having a curved face surface 46 for engaging the inner, cylindrical surface 20 of the roll shell. The inner side of the guide shoe 44 includes a flat, guide surface 48 and a piston portion 50 which extends outwardly from the guide surface 48. A piston carriage 52 includes a flat piston surface 54 which is in opposed interfacing relationship with the guide surface of the guide shoe to permit relative rotation therebetween. The piston portion 50 extends into a corresponding piston chamber 56 in the piston carriage to slidably mount the guide shoe for reciprocating movement relative to the piston carriage. This arrangement is collectively referred to as a compensating piston due to its ability to maintain a stabilizing force against the roll shell while varying its axial length as will be explained in more detail below.

One or more pockets 58 are located in the face of the guide shoe and are in fluid communication via conduits 61 with a distribution chamber 62 in the interior of the guide shoe, and which extends to the surface of the piston portion 50 to establish fluid communication with the piston chamber 56. A flexible hose 6 establishes communication with a source (not shown) of pressurized hydraulic fluid to chamber 56 via conduit 66 in the direction of arrow 67. A pair of pivot blocks 68 are disposed on either side of piston carriage 52 and are fixedly attached to the center shaft with cap screws 70. A pair of opposed, coaxial stub arbors 72 are mounted on either side, in the longitudinal direction, of the piston carriage and are pivotally received in the respective pivot blocks 68. The axes 74 of the arbors 72 on either side of guide shoe 44 are coincident and are parallel with the longitudinal axis 32 of the stationary support shaft 16. Similarly, the longitudinal axis 33 of roll shell rotation (FIGS. 3 and 4) is also theoretically parallel with the longitudinal axis 32 of the roll shaft and, when both of the support shoes 24,26 are extended the same distance, the axes 32,33 of the support shaft and roll shell are coincident as shown in FIG. 1 when deflection is not considered. Naturally, if the roll shaft and roll shell deflect differently, whether due to gravity or operating conditions, their longitudinal axes are not exactly coincident, but are substantially coincident.

The opposed stabilizing apparatus 12 includes a guide shoe 82 having a pair of opposed, coaxial stub arbors 84 mounted on either side thereof, and which in turn are rotatably mounted about their axes 85 in a pair of pivot blocks 86. The pivot blocks 86 are fixedly attached to a support plate 88 with cap screws 90 such that axes 85 are parallel with the longitudinal axis 33 of the roll shell when the roll is in a steady-state position, such as when the roll shell is not skewed relative to the support shaft.

In a manner similar to that described in conjunction with guide shoe 44, the curved face 92 of guide shoe 82 contains one or more pockets 94, which are linked via conduits 98 with a distribution chamber 100. A flexible hose 102 is connected to a source of pressurized hydraulic fluid (not shown) to introduce pressurized hydraulic fluid in the direction of arrow 104 through a conduit 106 into the distribution chamber 100, and eventually to the pockets in the face of the guide shoe via conduits 98 to provide lubrication between the face of the shoe and the inner surface of the roll shell.

A disk-like cylindrical pivot pin 108 has one end centered in the support plate 88 and received in a bore therein beneath the axe 85 of the arbors 84 which pivotally support the guide shoe 82. The other end of the pivot pin 108 is received in a shallow bore in the stationary support shaft 16. The tolerances between the pivot pin 108, and the bores support plate 88 and shaft 16 are such as to enable relative rotation between the shaft and support plate about the pivot pin 108 which is substantially perpendicular to the nip plane NP. Thus, the pivot blocks 86 for guide shoe apparatus 12 on the left are fixedly attached to the support plate 88 with cap screws 90, but the support plate 88 for the guide shoe apparatus 12 on the left is pivotally supported (i.e. rotatably attached) on a planar portion of the side of the support shaft 16 by pivot pin 108.

Accordingly, while the pivot blocks 68,86 on either side of the support shaft 16, in conjunction with pivot pin 108 and support plate 88, maintain the guide shoes 44,82 fixed from translational movement parallel with the nip plane NP, they permit pivotal movement of the guide shoes about axes 74,85 parallel with the longitudinal axis 32 of the roll. Further, due to the constructional features and arrangements previously described, the guide shoes can pivot in planes substantially parallel with the nip plane.

Figure 4:
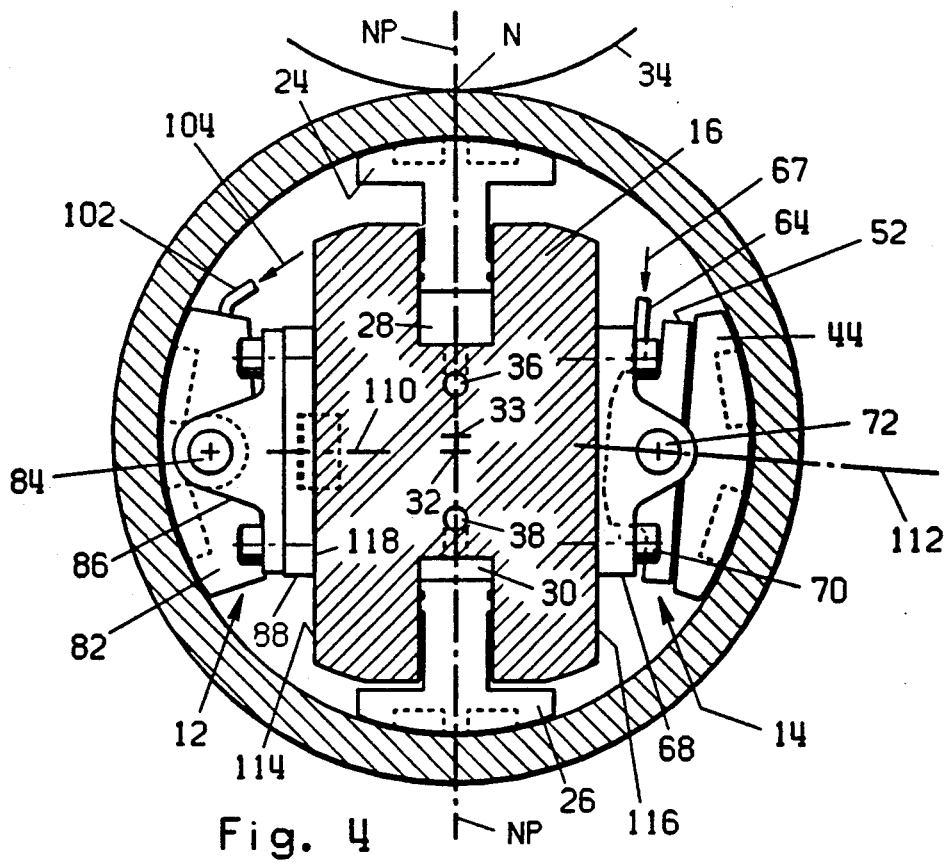
FIG. 4 is an end-elevational view, partially in section similar to that shown in FIG. 1, but showing the roll shell loaded into nipping engagement with its mating roll.

In operation, the roll shell is translationally actuated by operation of the support shoes 24,26 from a lowered position shown in FIG. 3 upwardly through a neutral position shown in FIG. 1 to an upper position shown in FIG. 4 wherein the roll shell is nipped at N with the mating roll 34. This movement is along the nip plane NP. Pressurized hydraulic fluid is introduced into flexible hoses 64,102 and into the pockets 58,94 of the guide shoes to provide lubrication between their faces and the inner surface of the roll shell. The pressurized hydraulic fluid entering piston chamber 56 also urges piston portion 50 outwardly and face surface 46 against the inner surface 20 of the roll shell to establish the opposed stabilizing forces produced by the pressure of guide shoe face surfaces 46,92 against the roll shell inner surface. The guide shoes pivot from an upwardly tilted position shown in FIG. 3, when the gap G is open, to a downwardly tilted position shown in FIG. 4 when the rolls are nipped together.

Lateral run-out between the inner radius of the rotating roll shell and the longitudinal axis of the roll shaft, and changes in the perpendicular distance of a given point on the inner surface of the roll shell from the nip plane NP during translational movement of the roll shell during operation, is accommodated by reciprocal movement of the piston portion 50 of the guide shoe within the piston chamber 56 of the piston carriage. Since the roll shell is an integral unit, radial movement, whether due to run-out or otherwise, over either of the guide shoes will cause a corresponding movement in the opposite direction over the other guide shoe, so only one compensating piston need be utilized at either end of the roll to maintain both opposed guide shoes in tracking engagement with the inner surface of the roll shell.

Since the piston portion 50 of guide shoe 44 is cylindrical, as is its piston chamber 56, the guide shoe 44 can pivot about a center axis of rotation 112 of the piston portion mounted in the piston carriage 52. This allows the curved face of the guide shoe to maintain more complete, or perfect, contact with the inner surface of the roll shell despite deflection, or skewing movement, of the roll shell in the nip plane relative to the support shaft due to deflection caused by the nip load, weight of the roll shell or roll crown compensation produced by the action of either, or both, support shoes 24,26. The arbor axes 74 are parallel with the longitudinal axis 32 of the roll shaft. They are substantially parallel with the longitudinal axis 33 of the roll.

The guide shoe apparatus 12 on the opposed side of the center shaft do not utilize a compensating piston or piston carriage. Instead, the face of the guide shoe is maintained in substantially complete contact over its entire area with the cylindrical inner surface of the roll shell by pivotal movement of the guide shoe 82 about arbors 84 and of the support plate 88 over the pivot pin 108. The axes 85,110 of the arbors and pivot pin are mutually perpendicular. The arbor axes 85 are, therefore, parallel with the axis 33 of the roll shell. They are substantially parallel with the longitudinal axis 32 of the roll shaft.

Thus, the guide shoe apparatus can accommodate translational movement of the roll shell in the nip plane into and out of nipping engagement with a mating roll by pivotal movement of the guide shoes 44,82 about their arbors 72,84 in combination with radially extensible movement of the compensating piston, and further in conjunction with rotational movement of guide shoe 44 about the piston portion 50 and support plate 88 about centering pivot pin 108.

The side walls 114,116 of the center shaft, or at least a portion near the ends thereof, are preferably parallel and finished sufficiently flat, at least beneath the pivot blocks, to securely mount pivot blocks 68, on wall 116, thereto. On the other side, side wall 114, or at least the portion 115 beneath support plate 88 is flat and interfaces with the flat inner surface 118 of the support plate 88. Thus, the pivot block mounting surfaces on side walls 114,116 near the ends of the center shaft do not have to be finished over a large area and do not have to be finished to the extent necessary to provide accurate reciprocal sliding motion thereon since the pivoting motion of the guide shoes about their arbors precludes any such sliding motion with the exception of some slight rotating motion at the interface between the support plate and corresponding side wall of the center shaft when the roll shell skews, or pitches, relative to the center shaft.

As the roll shell rotates and translates upwardly or downwardly relative to the support shaft, the opposed guide shoe apparatus does not have to slide over any finished surfaces on the support shaft. Instead, the guide shoes pivot about their arbors while their pressurized and lubricated faces provide stabilizing forces to the roll shell. Thus, the side walls 114,116 need to be neither flat nor parallel. Only a small area 115 on the support shaft beneath the support plate needs to be flat to provide an interface contact with the flat inner side of the support plate. This small area 115 should also be parallel with the nip plane. While the axes 85 deflect with the roll shell, and the axes 74 deflect with the roll shaft, both axes 74,85 are in planes which are parallel with the nip plane.

Naturally, variations in the structure of the invention can be made without departing from the spirit of the invention, and its disclosure, and the scope of the appended claims. For example, while the pressurized hydraulic fluid is described as being introduced through flexible hoses, it could be introduced by other means, such as through a conduit coincident with the axis of arbors 72,84. Similarly, while the pivotal shoes are described as being translationally fixed on the support shaft in the direction along the nip plane in the preferred embodiment, some movement of the pivot block supports in the direction of the nip plane is considered to be within the scope of the invention. Finally, it is understood that the roll shell is maintained axially positioned relative to the support shaft by means, not shown, such as the drive apparatus for rotating the roll shell.

What is claimed is:

1. A self-loading, controlled deflection roll for use in engaging another roll along a nip line of contact therewith, including a stationary support shaft having a longitudinal axis of the roll, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft and into, and out of, nipping engagement with the other roll and for supporting the roll shell, the combination comprising:

guide shoe means attached to the support shaft near both ends thereof, the guide shoe means at either end of the shaft including a pair of pivoted guide shoes in substantially opposed array on either side of the shaft and nip plane, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

the pivot of at least one said guide shoe is provided by pivotally mounting the guide shoe to support means;

the support means is rotatably attached to the support shaft and is so constructed and arranged as to permit the support means to rotate in a plane substantially parallel to the nip plane.

2. A self-loading, controlled deflection roll for use in engaging another roll along a nip line of contact therewith, including a stationary support shaft having a longitudinal axis of the roll, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft and into, and out of, nipping engagement with the other roll and for supporting the roll shell, the combination comprising:

guide shoe means attached to the support shaft near both ends thereof, the guide shoe means at either end of the shaft including a pair of pivoted guide shoes in substantially opposed array on either side of the shaft and nip plane, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

the pivot of at least one said guide shoe is provided by pivotally mounting the guide shoe to support means;

the support means is rotatably attached to the support shaft and is so constructed and arranged as to permit the support means to rotate in a plane substantially parallel to the nip plane;

the support means includes a centering pivot pin for rotatably attaching the support means to the support shaft.

3. A self-loading, controlled deflection roll for use in engaging another roll along a nip line of contact therewith, including a stationary support shaft having a longitudinal axis of the roll, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft and into, and out of, nipping engagement with the other roll and for supporting the roll shell, the combination comprising:

guide shoe means attached to the support shaft near both ends thereof, the guide shoe means at either end of the shaft including a pair of pivoted guide shoes in substantially opposed array on either side of the shaft and nip plane, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

the pivot of at least one said guide shoe is provided by pivotally mounting the guide shoe to support means;

the support means is rotatably attached to the support shaft and is so constructed and arranged as to permit the support means to rotate in a plane substantially parallel to the nip plane;

the support means includes a centering pivot pin for rotatably attaching the support means to the support shaft;

a flat area on the support shaft beneath the support means and substantially co-extensive therewith;

the support means includes a flat surface for forming an interface with the area on the support shaft for rotatably supporting the guide shoe means in a plane substantially parallel with the nip plane.

4. A self-loading, controlled deflection roll for use in engaging another roll along a nip line of contact therewith, including a stationary support shaft having a longitudinal axis of the roll, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft and into, and out of, nipping engagement with the other roll and for supporting the roll shell, the combination comprising:

guide shoe means attached to the support shaft near both ends thereof, the guide shoe means at either end of the shaft including a pair of pivoted guide shoes in substantially opposed array on either side of the shaft and nip plane, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

the guide shoe means at one end of the roll include a piston carriage pivotally mounted to the support shaft on one side thereof and a guide shoe mounted in the piston carriage for outward movement relative thereto, and a pivot block on the other side of the support shaft, the pivot block pivotally receiving a guide shoe, said pivot block mounted to a support plate which is rotatably attached to the support shaft.

5. A self-loading, controlled deflection roll for use in engaging another roll along a nip line of contact therewith, including a stationary support shaft having a longitudinal axis of the roll, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft and into, and out of, nipping engagement with the other roll and for supporting the roll shell, the combination comprising:

guide shoe means attached to the support shaft near both ends thereof, the guide shoe means at either end of the shaft including a pair of pivoted guide shoes in substantially opposed array on either side of the shaft and nip plane, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

the guide shoe means at one end of the roll include a piston carriage pivotally mounted to the support shaft on one side thereof and a guide shoe mounted in the piston carriage for outward movement relative thereto, and a pivot block on the other side of the support shaft, the pivot block pivotally receiving a guide shoe, said pivot block mounted to a support plate which is rotatably attached to the support shaft;

the support plate is rotatably attached to the support shaft with a pivot pin for pivoting movement about a center axis thereof, which center axis is substantially perpendicular to the nip plane.

6. In a self-loading, controlled deflection roll, including a stationary support shaft, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft, the improvement comprising:

pivot block means translationally fixed relative to the shaft at both ends thereof and in substantially opposed array on either side of the shaft and nip plane at each end of the shaft;

guide shoe means rotatably mounted in the pivot block means, each guide shoe means at either end of the shaft including a pair of pivoted guide shoes in substantially opposed array, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

one of the pivot block means of said each pair of opposed pivot block means at one end of the roll shaft includes a pivot block rotatably receiving a guide shoe, which pivot block is fixedly secured to a support plate; and which support plate is rotatably attached to the support shaft.

7. In a self-loading, controlled deflection roll, including a stationary support shaft, a roll shell having inner and outer cylindrical surfaces, said roll shell disposed about the shaft and defining, with the shaft, a space between the shaft and the inner surface of the roll shell, support shoe means mounted on the shaft and disposed to move the roll shell translationally along a nip plane relative to the support shaft, the improvement comprising:

pivot block means translationally fixed relative to the shaft at both ends thereof and in substantially opposed array on either side of the shaft and nip plane at each end of the shaft;

guide shoe means rotatably mounted in the pivot block means, each guide shoe means at either end of the shaft including a pair of pivoted guide shoes in substantially opposed array, each pivoted guide shoe including a curved face surface for engaging the inner surface of the roll shell and providing, with the other of said each pair of guide shoes, substantially opposed stabilizing forces to the roll shell as the roll shell translates and the guide shoes pivot during operation;

the support shoes and guide shoes providing the sole support of the roll shell about the support shaft;

one of the pivot block means of said each pair of opposed pivot block means at one end of the roll shaft includes a pivot block rotatably receiving a guide shoe, which pivot block is fixedly secured to a support plate, and which support plate is rotatably attached to the support shaft;

the support plate is rotatably mounted to rotate about an axis which is substantially perpendicular to the nip plane.

* * * * *